(12) United States Patent  (10) Patent No.: US 8,203,735 B2
Haneda et al.  (45) Date of Patent: Jun. 19, 2012

(54) CONTENT MANAGING SYSTEM (75) Inventors: Norihisa Haneda, Tokyo (JP); Yoshiko Shiimori, Asaka (JP)

(73) Assignee: Fujifilm Corporation, Tokyo (JP)

( * ) Notice: Subject to any disclaimer, the term of this patent is extended or adjusted under 35 U.S.C. 154(b) by 833 days.

(21) Appl. No.: 12/062,268

(22) Filed: Apr. 3, 2008

(65) Prior Publication Data

US 2008/0246991 A1  Oct. 9, 2008

(30) Foreign Application Priority Data

Apr. 4, 2007 (JP) ................................. 2007-098530

(51) Int. Cl.
G06F 3/12 (2006.01)
G06K 15/00 (2006.01)

(52) U.S. Cl. ....................................... 358/1.15; 358/1.9

(58) Field of Classification Search ................. 358/1.15, 358/471, 1.9, 1.6, 1.8; 345/146; 711/202, 711/100
See application file for complete search history.

(56) References Cited

U.S. PATENT DOCUMENTS
2003/0084099 A1  5/2003  Kamine

FOREIGN PATENT DOCUMENTS
| CN | 1379351 A | 11/2002 |
| JP | 2001-337887 A | 12/2001 |
| JP | 2002-149548 A | 5/2002 |
| JP | 2003-122617 A | 4/2003 |
| JP | 2003-131988 A | 5/2003 |
| JP | 2003-316677 A | 11/2003 |

*Primary Examiner* — Jerome Grant, II (74) *Attorney, Agent, or Firm* — Birch, Stewart, Kolasch & Birch, LLP (57) ABSTRACT

A managing system causes content managed by a server to be updated by a portable terminal by means of a communication network and includes a content updatable location registering device which registers a location which can be updated by a portable terminal.

8 Claims, 12 Drawing Sheets

◇ TEXT MANAGING TABLE (EXAMPLE)

| TEXT ID | FILE NAME | TYPE | GENERATION DATE | GENERATING PERSON (USER ID) |
|---|---|---|---|---|
| 1 | ¥¥aaa¥bb¥ccc.doc | doc | 2006.11.23 | 1 |
| 2 | ¥¥aaa¥bb¥ee.doc | doc | 2006.11.29 | 1 |
| 3 | ¥¥aaa¥cc¥dd.xls | xls | 2006.12.3 | 2 |
| 4 | ¥¥bbb¥cc¥ff.ppt | ppt | 2006.12.3 | 3 |
| 5 | ¥¥bbb¥cc¥gg.ppt | ppt | 2006.12.12 | 2 |

FIG.4

GENERATING PERSON MANAGING TABLE (EXAMPLE)

| USER ID | PASSWORD | GENERATING PERSON NAME |
|---|---|---|
| 1 | aaa | TAROU FUJI |
| 2 | bbb | HANAKO FUJI |
| 3 | ccc | JIROU ASAKA |

FIG.5

◇ TEXT ATTRIBUTE MANAGING TABLE
  (EXAMPLE)

| TEXT ID | ATTRIBUTE ID |
|---|---|
| 1 | 2 |
| 1 | 4 |
| 1 | 6 |
| 2 | 2 |
| 2 | 5 |
| 2 | 7 |
| 3 | 3 |
| 3 | 6 |
| 4 | 1 |
| 4 | 4 |
| 4 | 6 |

FIG.6A

✧ ATTRIBUTE MANAGING TABLE (EXAMPLE)

| CATEGORY ID | CATEGORY |
|---|---|
| 1 | OBJECT |
| 2 | OFFICE |
| 3 | PROJECT |

FIG.6B

| ATTRIBUTE ID | CATEGORY ID | ATTRIBUTE |
|---|---|---|
| 1 | 1 | PRESENTATION |
| 2 | 1 | QUOTATION |
| 3 | 1 | SPECIFICATION |
| 4 | 2 | SALES 1 GROUP |
| 5 | 2 | SALES 2 GROUP |
| 6 | 3 | PORTABLE PHONE SALES EXPANDING |
| 7 | 3 | NEW BUSINESS SEARCHING |

FIG.7

◇ UPDATABLE LOCATION MANAGING TABLE (EXAMPLE)

| TEXT ID | UPDATED LOCATION | EXISTING INFORMATION |
|---|---|---|
| 1 | HEADER | FUJI OOOO (CORP) |
| 1 | DATE | 2006.11.23 |
| 1 | DESTINATION | DEAR OO TRADE CORPORATION |
| 1 | PERSON IN CHARGE NAME | TAROU FUJI |
| 2 | ALL PAGES: FIRST LINE | FUJI OOOO (CORP) |
| 2 | ALL PAGES: SECOND LINE | 2006.11.29 |
| 2 | 1 PAGE: THIRD LINE | TAROU FUJI |
| 2 | 1 PAGE: FOURTH LINE | DEAR △△ CORPORATION |
| 3 | DATE | 2006.12.3 |
| 4 | FIRST PAGE: FIRST LINE | SYSTEM FOR XX CORPORATION |
| 5 | FIRST PAGE: THIRD LINE | HANAKO FUJI |

CONTENT MANAGING SYSTEM

BACKGROUND OF THE INVENTION

1. Field of the Invention

The present invention relates to a content managing system, particularly, to a content managing system in which a variety of contents including texts and images can be unitedly managed, and the contents can be browsed and updated from a portable terminal such as a portable phone.

2. Description of the Related Art

In recent years, ECM (Enterprise Content Management) solution has been being diffused to activate and streamline company operations, the ECM solution being used to obtain, manage, maintain, and store, and deliver a variety of pieces of information overflowing in companies, i.e. contents such as not only texts, but also images and Web contents through the whole area of the companies. It is considered that the advantageous effect of the ECM solution is mostly activated when an external presentation and a business operation are executed, and it is preferable to adapt the ECM solution to a mobile environment in which the ECM solution is frequently used outside.

Japanese Patent Application Laid-Open No. 2003-316677 and Japanese Patent Application Laid-Open No. 2001-337887 disclose inventions which improve the convenience that contents delivered through a communicating network can be used in a portable terminal such as a portable phone.

However, currently, it is an actual condition that the ECM solution suitable to the mobile environment rarely exists, and for example, when it is necessary to browse contents unifiedly managed in a company, such as a variety of formats (file format) of texts and images, with the portable terminal such as a portable phone from outside through the communicating network, the contents may not be browsed with the portable terminal depending on a type of the format. Even if the necessary content can be browsed outside, when it is necessary to change a part of the content, the part may not be changed from the portable terminal, so that the ECM solution does not satisfy needs of a user.

SUMMARY OF THE INVENTION

The present invention has been invented in consideration of such a circumstance, and an object of the present invention is to provide a content managing system in which a variety of contents unifiedly managed in a company can be easily browsed or updated by a portable terminal.

To achieve the above object, the content managing system described in the first aspect of the present invention is a content managing system causing each content managed by a server connected to a communicating network to be able to be updated by a portable terminal which can be connected to the communicating network, and includes a content updatable location registering device which previously registers a location which can be updated by the portable terminal for each of the contents in the server, a content selecting device which selects a desired content of each of the contents with the portable terminal, an updated location selecting device which selects a location to be updated with the portable terminal from the locations registered as an updatable location by the content updatable location registering device for the content selected by the content selecting device, an updated data inputting device which inputs updated data of the location selected by the updated location selecting device with the portable terminal, and an updated content generating device which generates an updated content obtained by changing data of the location selected by the updated location selecting device to the updated data inputted by the updated data inputting device for the content selected by the content selecting device in the server.

According to the present invention, for each content managed by the server, when a location which can be updated by the portable terminal such as a portable phone is previously registered, and the content is updated by the portable terminal, it is enough that the location to be updated is selected, and data to be updated of the selected location is inputted, so that the content becomes able to be easily updated by the portable terminal.

In the invention described in the first aspect, the content managing system described in the second aspect of the present invention is characterized in that the content updatable location registering device automatically sets a location to be updated when registering each of the contents as a content managed by the server.

An aspect of the present invention is to automatically set a location to be registered as an updatable location for the content managed by the server. For example, if the content is a text, it is possible to automatically set a location as an updatable location, in which words such as a header and a date are described, the words being described in a location determined in a fixed pattern, and being highly possible to be updated.

In the invention described in the first aspect, the content managing system described in the third aspect of the present invention is characterized in that the content updatable location registering device includes an updatable location designating device which designates an location to be updated from a user, and registers the location designated by the updatable location designating device as the location to be updated when registering each of the contents as the content managed by the server.

The present invention shows an aspect of a device which designates the updatable location from a user for the second aspect.

In the invention described in the first, second, or third aspect, the content managing system described in the fourth aspect of the present invention is characterized by including a format converting device which converts a content selected by the content selecting device, or a content generated by the updated content generating device to a format which can be browsed by the portable terminal, and transmits the converted content from the server to portable terminal.

According to the present invention, even if a format (file format) of a content managed by the server is a format which can not be browsed by the portable terminal, the content becomes able to be browsed by the portable terminal.

In the invention described in the first, second, third, or fourth aspect, the content managing system described in the fifth aspect of the present invention is characterized by including an updated content registering device which registers the updated content generated by the updated content generating device as a new content managed by the server.

According to the present invention, the updated content updated by the portable terminal becomes able to be browsed in another opportunity.

In the invention described in any one of the first to fifth aspects, the content managing system described in the sixth aspect of the present invention is characterized by including a printing device which causes a printing equipment to print the content selected by the content selecting device, or the content generated by the updated content generating device, the printing equipment being a printing equipment connectable to the communicating network, and being designated by the portable terminal.

According to the present invention, the content managed by the server becomes able to be printed by the printing equipment in a desired area according to an instruction of the portable terminal.

In the invention described in any one of the first to sixth aspects, the content managing system described in the seventh aspect of the present invention is characterized in that the content is a text. This aspect limits the content to be processed to a text.

In the invention described in any one of the first to seventh aspects, the content managing system described in the eighth aspect of the present invention is characterized in that the portable terminal is a portable phone. This aspect limits the portable terminal to be processed to the portable phone which is frequently used.

According to the present invention, a variety of contents unifiedly managed in a company, and the like, become able to be easily browsed or updated by the potable terminal. Thus, the opportunity is expanded, in which the ECM solution is utilized.

DETAILED DESCRIPTION OF THE PREFERRED EMBODIMENTS

The best embodiment for implementing a content managing system according to the present invention will be described in detail below according to the attached drawings.

Figure 1:
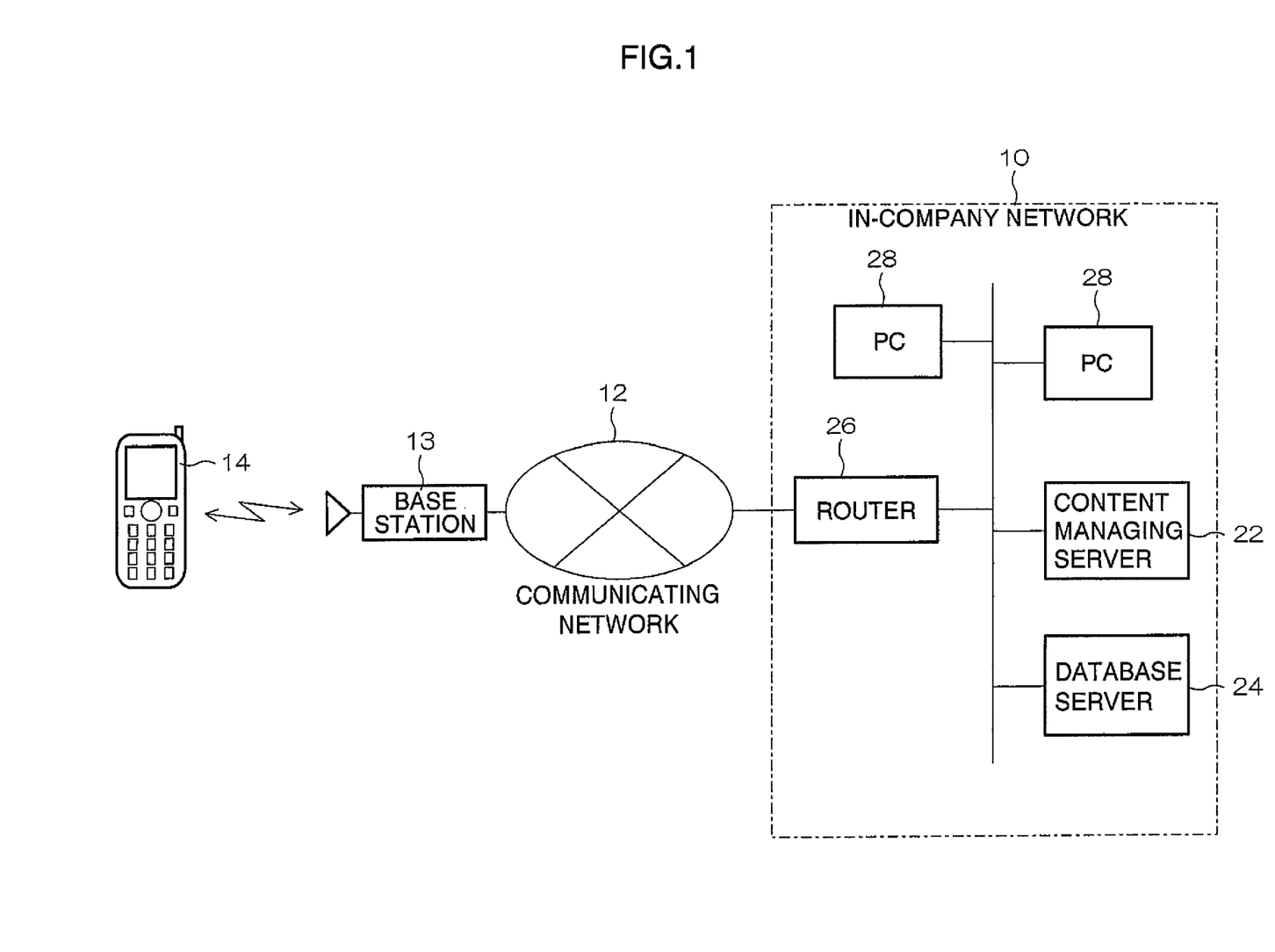
FIG. 1 is a system diagram illustrating an entire configuration of a content managing system to which the present invention is applied.

FIG. 1 is a system diagram illustrating an entire configuration of a content managing system to which the present invention is applied. The content managing system of FIG. 1 is, for example, a system for unifiedly managing a variety of pieces of information in a company as the ECM (Enterprise Content Management) solution, and is configured with an in-company network (intranet) 10 installed in a company, a communicating network 12 such as the Internet installed outside a company, a portable phone 14 which is connectable to the communicating network 12 through a base station 13, and the like. Meanwhile, while the present invention can be also applied to other type of portable terminal such as a PDA and a note-type personal computer and a personal computer instead of the portable phone 14, the present embodiment will be described under such a condition that the portable phone is used.

The in-company network 10 is constructed with a router 26, a content managing server 22, a database server 24, a personal computer (PC) of each employee installed in a company 28, 28, and the like. Such equipments in the in-company network 10 are connected to the communicating network 12 outside a company through the router 26.

The portable phone 14 denotes an arbitrary portable phone owned by an employee, or the like, and can be connected to the communicating network 12 through the base station 13. By connecting the portable phone 14 to the communicating network 12, the content managing server 22 in the in-company network 10 can be accessed, and information delivered from the content managing server 22 can be obtained and be browsed as a file which can be browsed by the portable phone 14 such as a html file and an image file (JPEG file, etc.).

In the in-company network 10, information (content), such as a text and an image, generated in a variety of formats (file formats) in a company by the content managing server 22 and the database server 24 is unifiedly managed, and a variety of contents are accumulated and stored in the database server 24.

The content managing server 22 includes a function which obtains a content requested by the portable phone 14 from the database server 24 for the portable phone 14 accessing from outside the in-company network 10 through the communicating network 12, and converts the content to a format which can be browsed by the portable phone 14 to transmit the content. Thereby, the content such as a text and an image in a company, the content being stored in the database server 24 in a variety of formats, can be browsed by the portable phone 14 outside the company.

By accessing the content managing server 22 from the portable phone 14, a content stored in the database server 24 is not only browsed, but also a necessary location of the content can be changed (updated) by an editing operation in the portable phone 14, and if necessary, the content can be also printed out by a nearby printer. Thus, the cases in which the ECM solution is utilized for a business operation are widely increased, and the ECM solution has become more profitable.

Meanwhile, while the present embodiment is described by limiting the content which can be updated by the portable phone 14 to a text, the present embodiment can be applied to not only the text, but also other content such as an image. For example, a character or a figure which is a part of the content can be also updated by the portable phone 14, and the content such as an image can be also widely edited by a mobile equipment with a high-level editing function such as a note-type personal computer other than the portable phone 14.

So that the updating work can be easily executed in the portable phone 14, when registering a new text from the PC 28 in a company to the database server 24, by previously designating a location which can be updated by the portable phone 14 in the text information thereof is also stored together with the text in the database server 24. When the text is updated by the portable phone 14, the editing work can be easily executed only for a part which is designated as an updatable part. Meanwhile, the detail will be described later.

Figure 2:
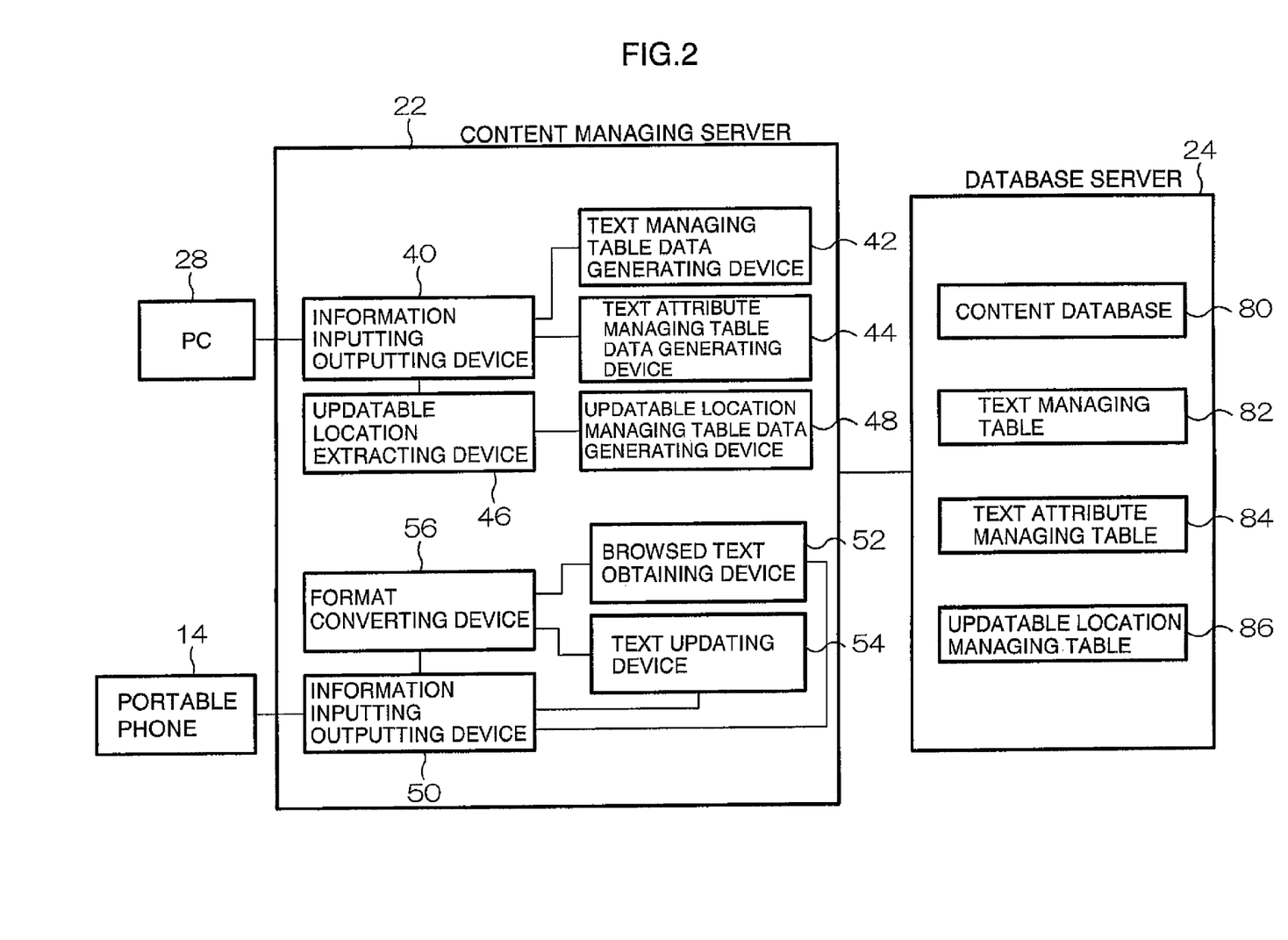
FIG. 2 is a system diagram illustrating a processing device relating to the registering for a text with a PC in an in-company network, and the browsing and updating for the registered text with a portable phone.

FIG. 2 is a system diagram illustrating a processing device relating to the registering for a text by the PC 28 in the in-company network 10, and the browsing and updating for the registered text by the portable phone 14.

First, in FIG. 2, a content to be processed by a processing device will be described, the processing device relating to the registering for a text by the PC 28 in the in-company network 10. In FIG. 2, the PC 28 denotes a personal computer used by a text registering person which registers the text, and the text registering person initiates a desired application for generating a text at the PC 28 to generate the text, and stores the generated text in an arbitrary format (file format). The text registering person accesses (connects to) the content managing server 22 from the PC 28, and executes a series of registering works to register the text in the database server 24.

On the other hand, relating to the registering for a text, the content managing server 22 is provided with an information inputting outputting device 40, a text managing table data generating device 42, a text attribute managing table data generating device 44, an updatable location extracting device 46, and an updatable location managing table data generating device 48, and the like.

The information inputting outputting device 40 provides the PC 28 accessing to the content managing server 22 with a variety of guidance screens for guiding the registering for a text, and obtains information inputted by the text registering person for the guidance screens as information which is necessary to manage data (file) of a text to be registered (registered text) and a text. Meanwhile, the information inputting outputting device 40 first prompts a user accessing to the content managing server 22 to input a password, and the like, and also, executes a user authentication whether or not the user owns an access right. Only the user which is authenticated to own the access right can register a text.

Each of the text managing table data generating device 42, the text attribute managing table data generating device 44, and the updatable location managing table data generating device 48 generates data for an after-mentioned text managing table 82, data for a text attribute managing table 84, and data for an updatable location managing table 86, which are described later, based on information which is inputted by the PC 28, and is obtained by the information inputting outputting device 40. The data for the after-mentioned text managing table 82, the data for the text attribute managing table 84, and the data for the updatable location managing table 86 are transferred from the content managing server 22 to the database server 24 together with a file of the registered text, and are stored in the database server 24 as data (record) of the text managing table 82, the text attribute managing table 84, and the updatable location managing table 86 respectively. The file of the registered text is stored in the content database 80 of the database server 24.

Here, data structures of the text managing table 82, the text attribute managing table 84, and the updatable location managing table 86 will be described.

Figure 3:
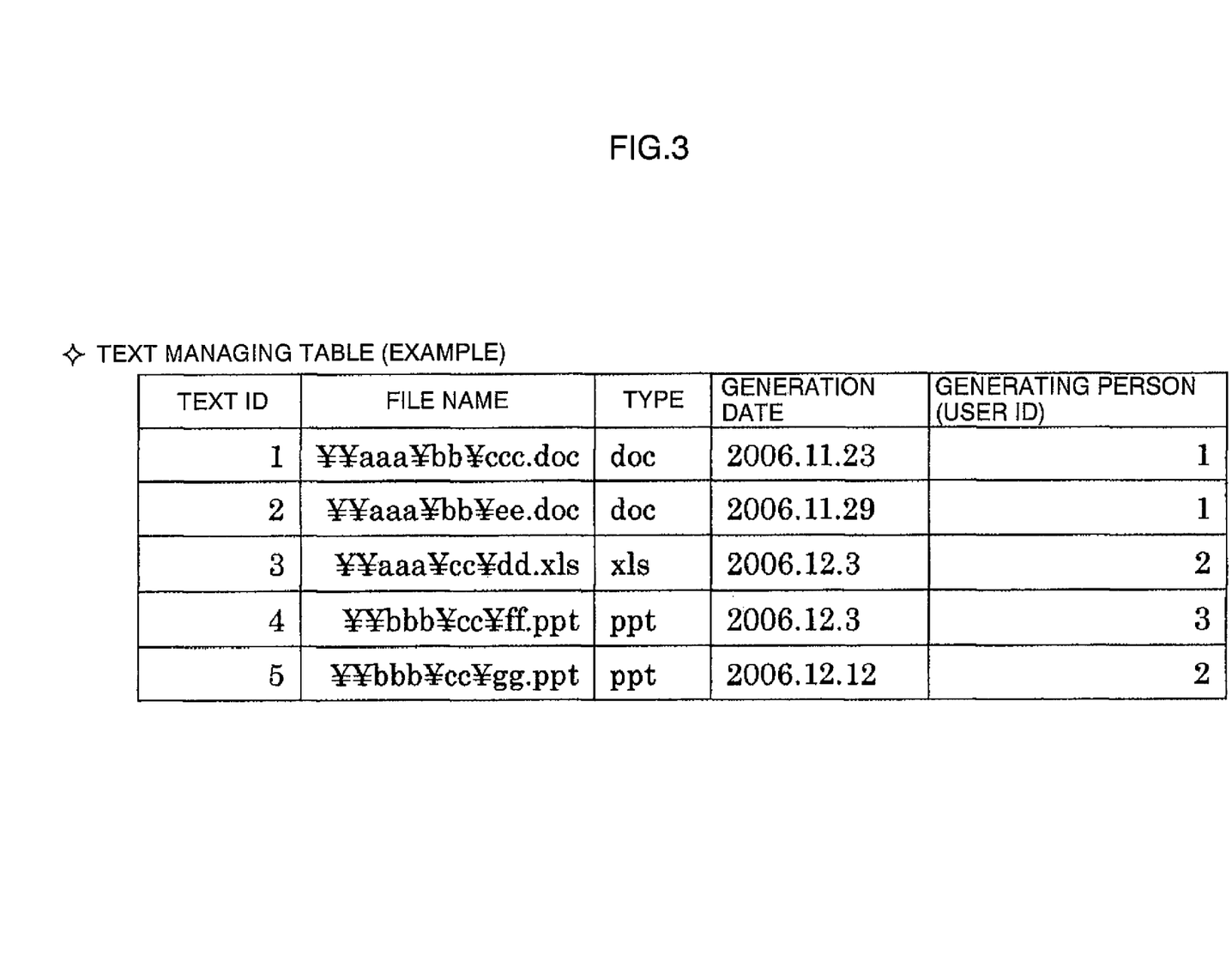
FIG. 3 is a diagram exemplifying a data structure of a text managing table.

FIG. 3 is a diagram exemplifying a data structure of the text managing table 82. As illustrated in FIG. 3, a record of one item is configured with a group of data of each field of [text ID], [file name], [type], [generation date], [generating person] for one registered text (content).

Figure 4:
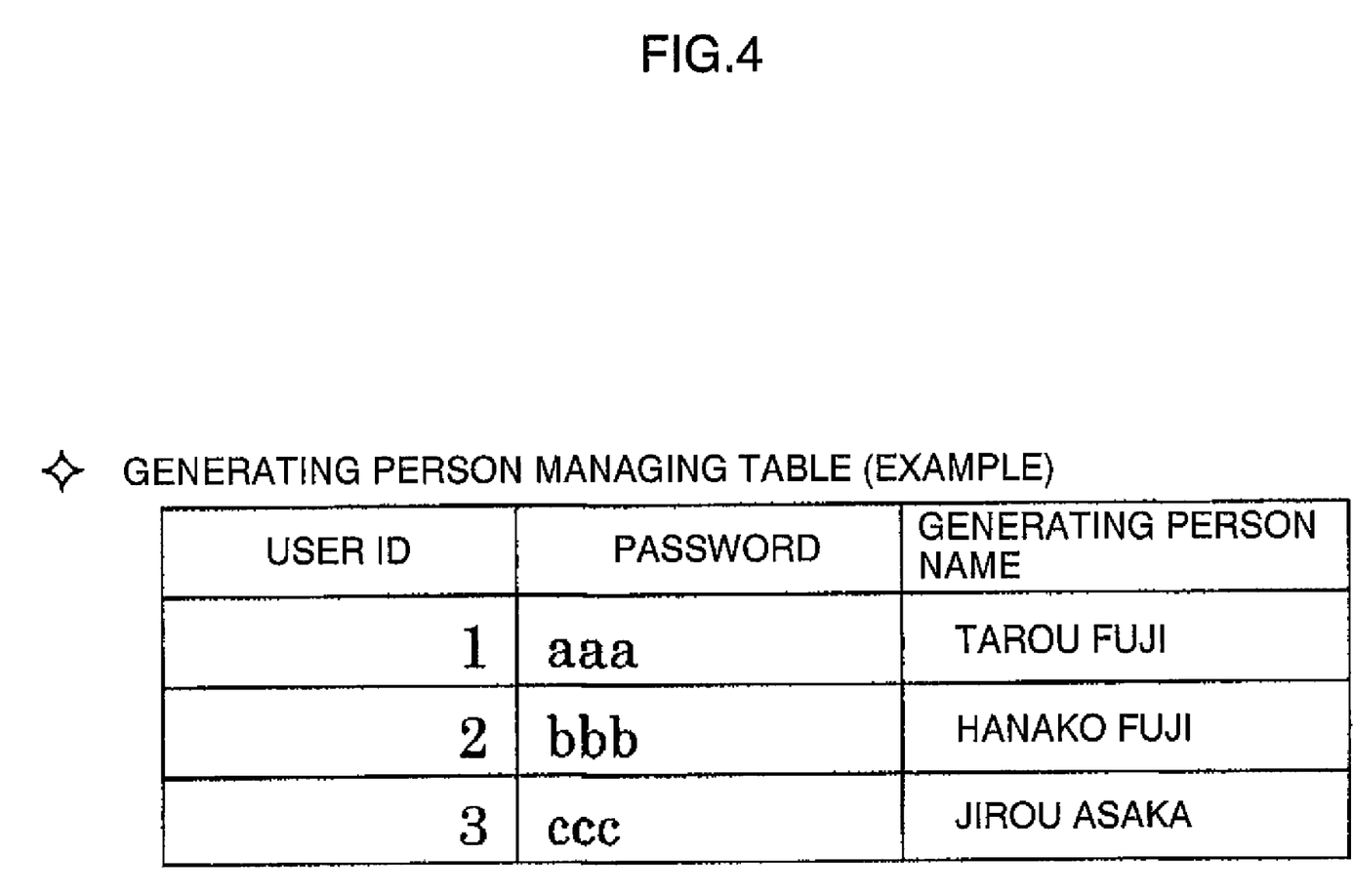
FIG. 4 is a diagram exemplifying a data structure of a generating person managing table.

[Text ID] is data of an identification number attached for simply identifying the corresponding registered text, [file name] is data illustrating an address on a memory in which a file of the corresponding registered text is stored, and [type] is data illustrating a file format (format) of the corresponding registered text. [Generation date] is data of a day (or, registration day) on which the corresponding registered text has been generated, and [generating person] is data of the identification number (user ID) previously attached to the generating person which has generated the corresponding registered text. The user ID is previously generated as a generating person managing table (omitted in FIG. 2) as illustrated in FIG. 4 to be managed by the database server 24, and a record of one item is configured with a group of data of each field of [user ID], [password], and [generating person name] for each user. Meanwhile, the data of [password] is, for example, used as authentication information for authenticating that the PC 28 or the portable phone 14 owns the access right when accessing the content managing server 22, and is previously determined for each user to be managed by the generating person managing table of FIG. 4.

The data of each field of the text managing table 82 is automatically generated by the text managing table data generating device 42 of the content managing server 22 when the text registering person registers a text from the PC 28 (the authentication information is, for example, used for data of [generating person]), and is added as a record of the text managing table 82.

Figure 5:
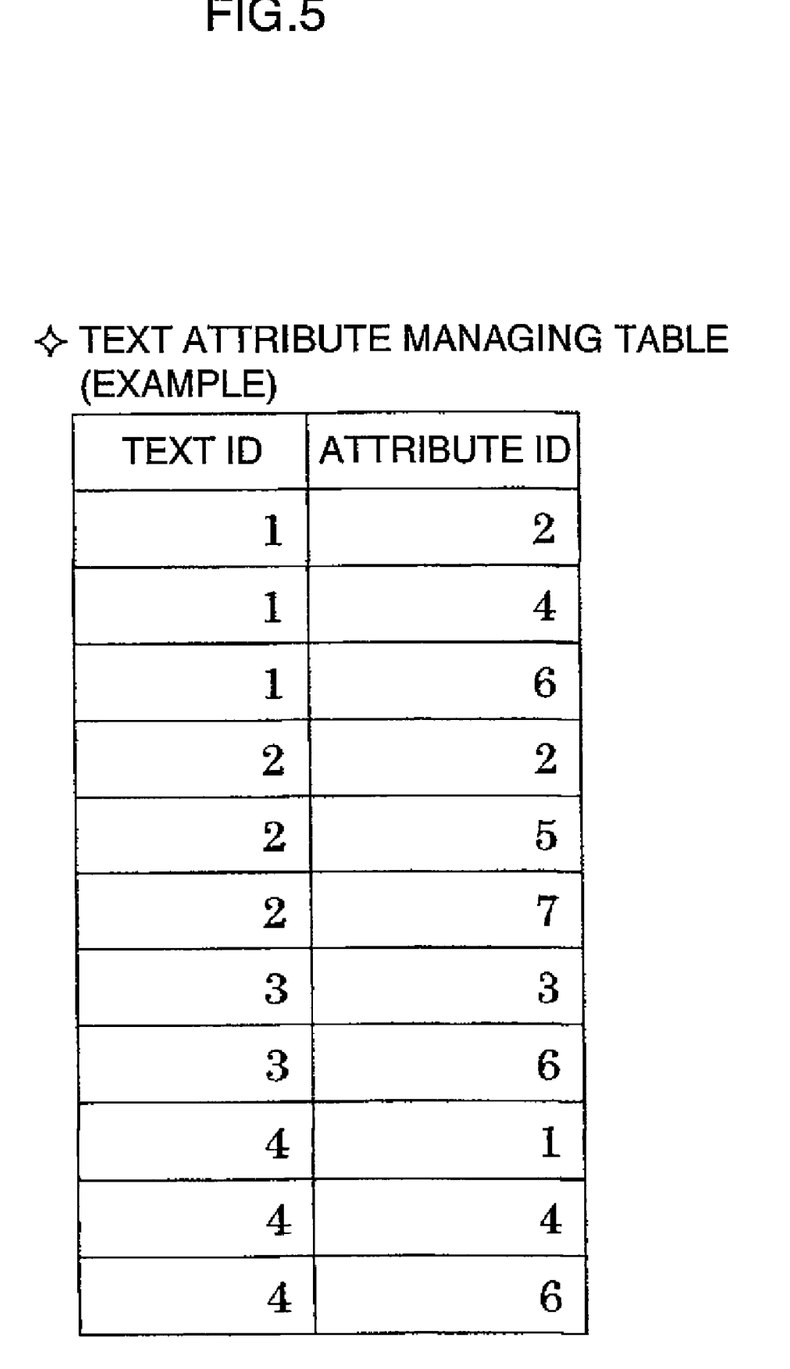
FIG. 5 is a diagram exemplifying a data structure of a text attribute managing table.

FIG. 5 is a diagram exemplifying a data structure of the text attribute managing table 84. As illustrated in FIG. 5, a record of one item is configured with a group of data of each field of [text ID] and [attribute ID] for one text.

Figure 6A:
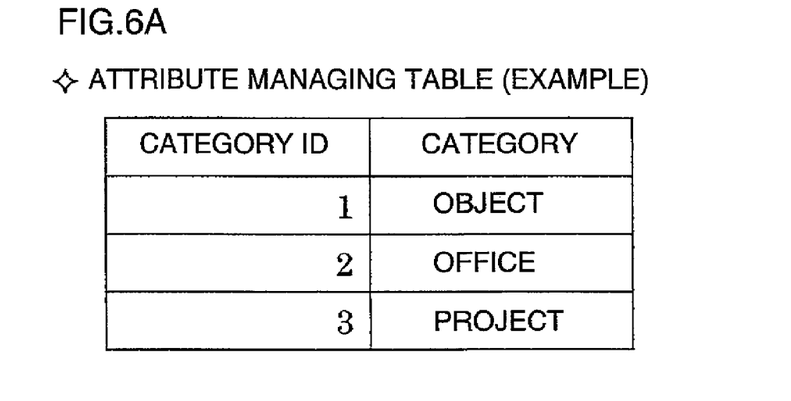
FIGS. 6A and 6B are diagrams exemplifying a data structure of an attribute managing table.
Figure 6B:
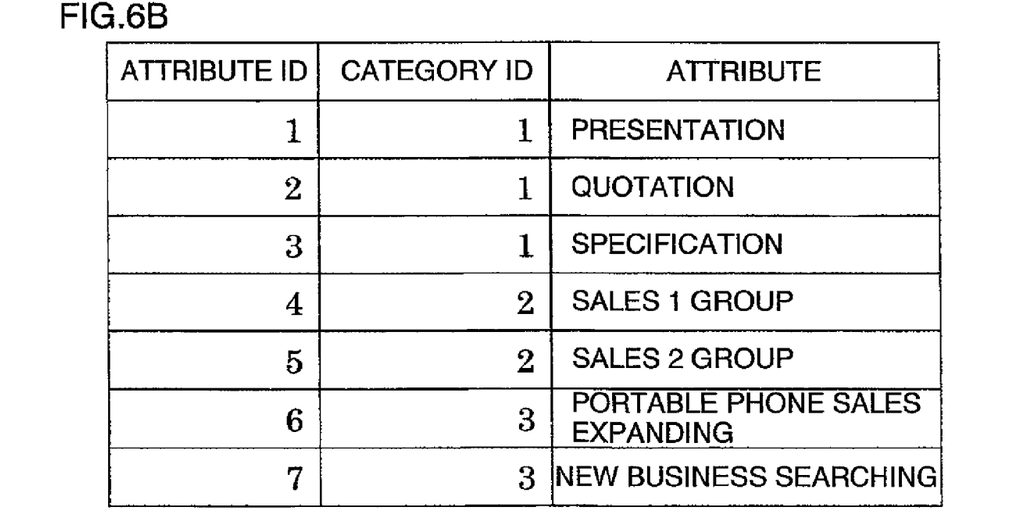

[Text ID] is data of an identification number attached to the corresponding registered text, and [attribute ID] is data of an identification number indicating an attribute of the corresponding registered text. [Attribute ID] is previously generated as an attribute managing table as illustrated in FIGS. 6A and B to be managed by the database server 24, and the identification number illustrated in a field of [attribute ID] is attached to each attribute which is considered as an attribute of the text as in the table of FIG. 6B, and also, the attribute indicated by the [attribute ID] is indicated by data of each field of [category ID] and [attribute]. [Category ID] of FIG. 6B indicates an attribute with an identification number, the attribute being indicated by data of a field, [category] like the table of FIG. 6A.

According to this [category], an attribute of a text is classified to a major classified attribute such as [object], [office], and [project] as illustrated by [category] of FIG. 6A, and numbers of 1, 2, 3 are attached to each of such major classified attributes as a category ID. On the other hand, in FIG. 6B, each attribute (category) of the major classified attribute for each category ID=1, 2, and 3 is classified to a small minor classified attribute, and for example, the major classified attribute of [object] of the category ID=1 is classified to the minor classified attributes of [presentation] and [quotation], and numbers of 1, 2, 3 are attached to each of such minor classified attributes as an attribute ID. Thus, as illustrated in the text attribute managing table 84 of FIG. 5, the attribute of the registered text is specified by relating the attribute ID to the text ID of each registered text.

Such data (record) regarding each text of the text attribute managing table 84 is generated when the text registering person registers the text from the PC 28. For example, when information regarding the attribute is obtained, the information being inputted by the text registering person according to the guidance screen displayed by the information inputting outputting device 40 of the content managing server 22, based on such attribute information, the record regarding the registered text of the text attribute managing table 84 is generated by the text attribute managing table data generating device 44.

Next, the record is transferred to the database server 24 to be added to the text attribute managing table 84.

Figure 7:
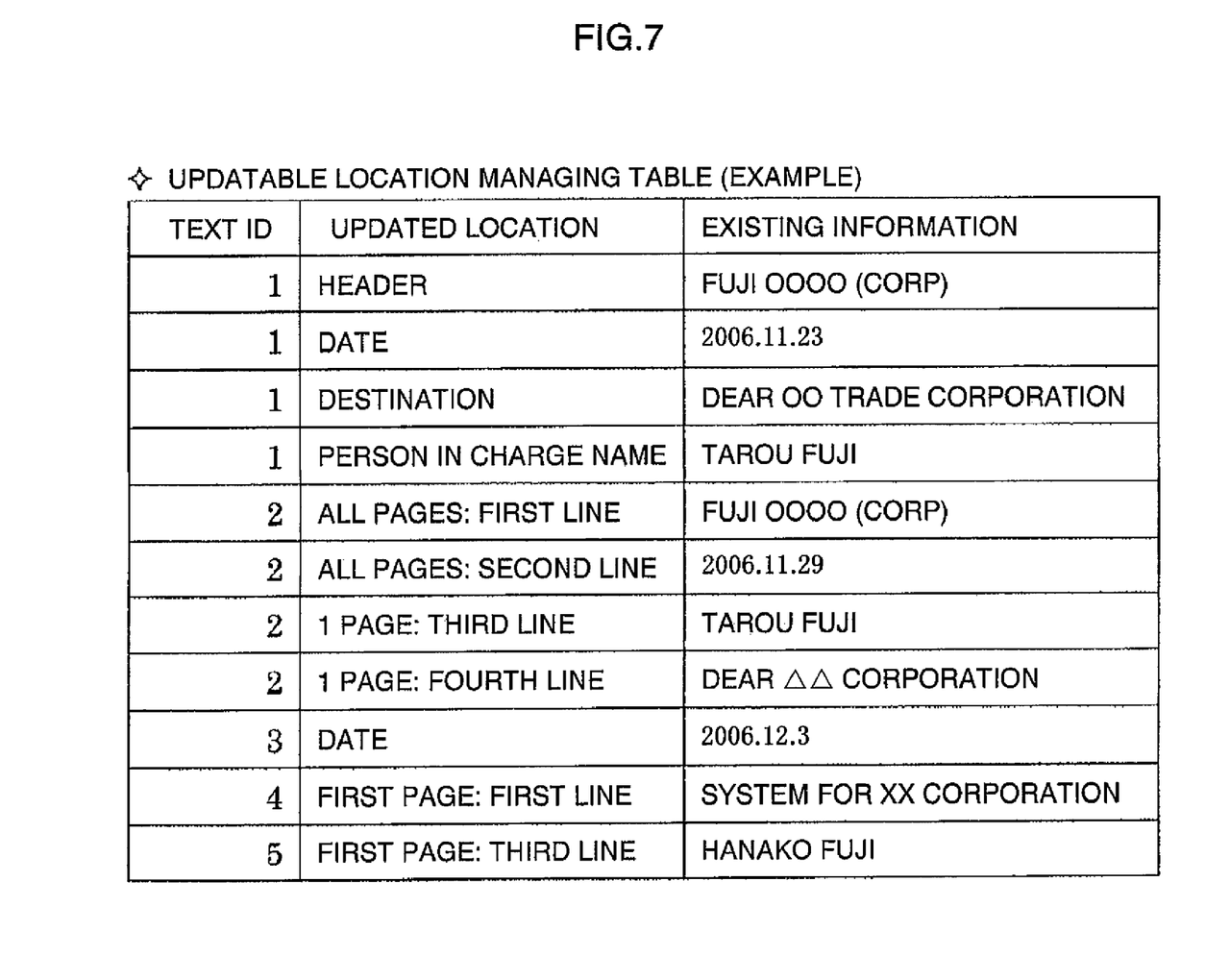
FIG. 7 is a diagram exemplifying a data structure of an updatable location managing table.

FIG. 7 is a diagram exemplifying a data structure of the updatable location managing table 86. As illustrated in FIG. 7, in the updatable location managing table 86, a record of one item is configured with a group of data of each field of [text ID], [location to be changed], and [existing information]. [Text ID] is data of the identification number of the corresponding registered text as described above, [location to be changed] is data which indicates an area of updatable (changeable) words in the corresponding registered text by using a page number and a line number, and [existing information] is data which indicates words written in the updatable location.

Figure 8A:
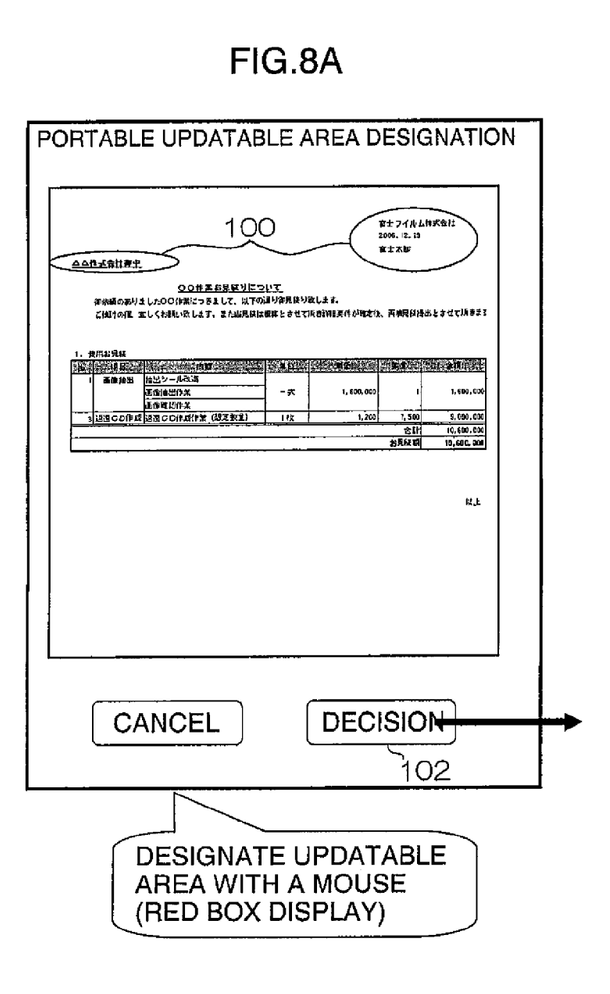
FIGS. 8A and 8B are diagrams exemplifying a screen when an updatable location is set.
Figure 8B:
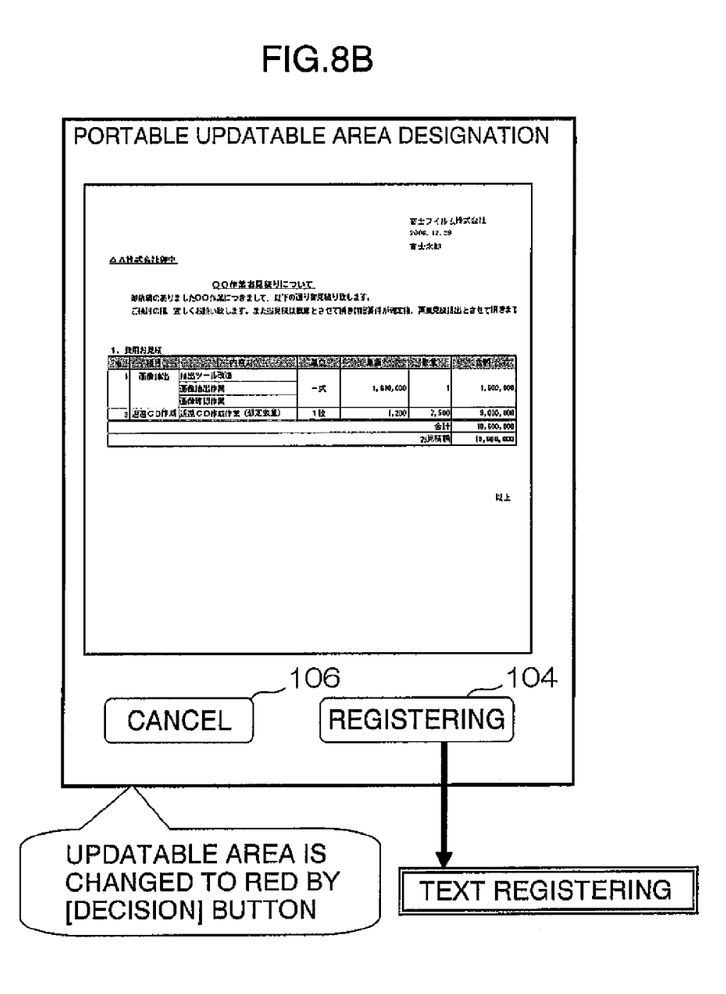

Here, the updatable location of the registered text is manually or automatically set when the text registering person registers a text from the PC 28. For example, when the updatable location is manually set, a screen as illustrated in FIG. 8A is displayed in the PC 28. In FIG. 8A, content of a text to be registered is displayed, and the text registering person surrounds an area including the updatable location with a circle 100, for example, by using a mouse. When a plurality of the updatable locations exist as illustrated in FIG. 8A, a plurality of such updatable locations are sequentially designated. When a decision button 102 under a screen is clicked, a confirmation screen as illustrated in FIG. 8B is displayed. In this case, words in the area designated by the text registering person are extracted by the updatable location extracting device 46 (refer to FIG. 2) of the content managing server 22. Thereby, in the confirmation screen, the words in the area designated by the text registering person are displayed in a display color such as red, which is different from other color, as the updatable location and words. In the confirmation screen, if the updatable location (words) is correctly set, a registration button 104 under the confirmation screen is clicked, and when it is necessary to designate the area again, a cancel button 106 is clicked and the process returns to the screen of FIG. 8A, and the area is re-designated. Meanwhile, the updatable location may be designated by directly designating the updatable words area by using a position designating device such as a cursor which moves in a character unit.

On the other hand, when the updatable location is automatically set, a predetermined area (a position area in a text) is set as an area including the updatable location by the updatable location extracting device 46 of the content managing server 22, and the words in the area are extracted. The area which is predetermined as an updatable area is, for example, preferable for an area in which words are described, such as a header, a date, a destination, and a name of a person in charge, whose position area in a text is roughly determined in a general text, as exemplified in the field of [updated location] of the updatable location managing table of FIG. 7. The position area in a text is not determined as the area which is predetermined as an updatable area, but, words which are highly possible to be changed, such as a company name, a person name, and a figure (date, an amount of money, and the like), are retrieved, and a location of the corresponding words may be set as the updatable location. In addition, even if the updatable location is set manually or automatically, the location which is set as an updatable location by the above processing, or all of the locations of words obtained by retrieving words which are the same as the above words through the whole text may be automatically set as a changeable location.

As described above, when the updatable location is set by the updatable location extracting device 46 of the content managing server 22, and words of the location is extracted, based on information thereof, the record regarding the registered text of the updatable location managing table 86 illustrated in FIG. 7 is generated by the updatable location managing table data generating device 48. Next, such record is transferred to the database server 24 to be added to the updatable location managing table 86.

Figure 9:
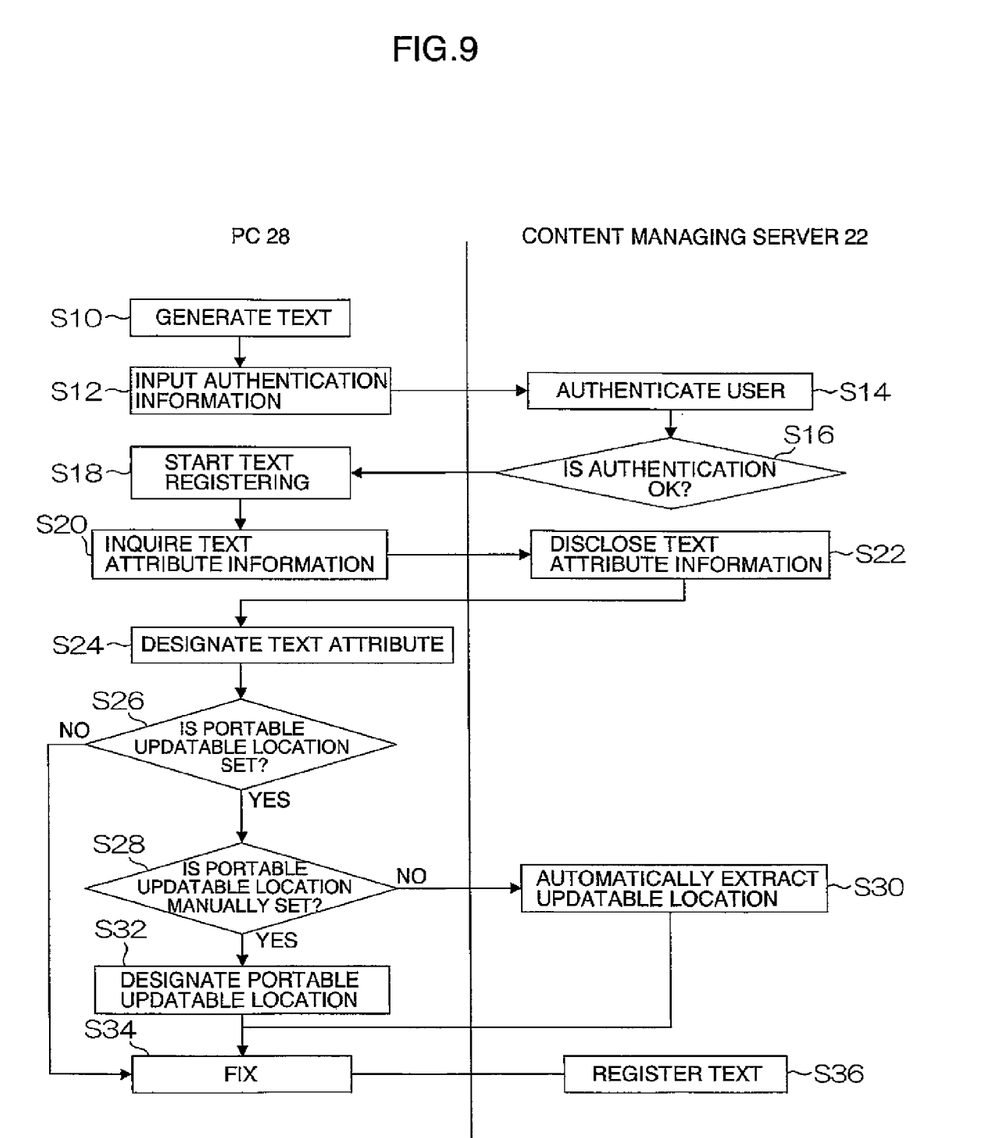
FIG. 9 is a sequence diagram illustrating a process in a time sequence when a text is registered in the PC and a content managing server.

FIG. 9 is a sequence diagram illustrating a process in a time sequence when a text is registered in the PC 28 operated by the text registering person and the content managing server 22 managed by a server manager.

First, the text registering person generates the registered text with the PC 28 (step S10). Next, the text registering person accesses the content managing server 22. Thereby, a user authentication screen transmitted by the information inputting outputting device 40 of the content managing server 22 is displayed on a monitor of the PC 28. The text registering person inputs the previously-registered authentication information such as a password on the user authentication screen to indicate that the text registering person owns the access right (step S12).

On the other hand, the content managing server 22 checks the authentication information obtained by the information inputting outputting device 40, and the generating person managing table of FIG. 4 stored in the database server 24, and executes the user authentication whether or not the accessing text registering person owns the formal access right (step S14). Next, the content managing server 22 determines whether or not the user authentication has been appropriately executed (step S16), and when the determination is NO, the user is restricted to access, when the determination is YES, the user is allowed to access, and the content managing server 22 transmits the guidance screen for registering the text to the PC 28.

If the guidance screen is displayed on the PC 28 (a display of the PC 28), the text registering person starts a for for registering the text (step S18). First, the text registering person inquires text attribute information of the content managing server 22 to acknowledge what attribute exists as a text attribute (step S20). The content managing server 22 obtains the attribute managing table illustrated in FIGS. 6A and 6B from the database server 24, and discloses content of designatable attributes, and the like as the text attribute information to the PC 28 (step S22). The text registering person designates an attribute of the text to be registered based on the disclosed text attribute information (step S24).

Next, the text registering person designates whether or not to set an area in which the registered text can be updated by the portable phone 14 (step S26). When the designation is NO (the area is not set), the process moves to a fixing operation of step S34. On the other hand, when the designation is YES (the area is set), next, the text registering person designates whether or not to manually designate the updatable area (location) (step S28). When the designation is NO (automatically), the updatable location is automatically extracted as described above by the updatable location extracting device 46 of the content managing server 22 (step S30). Next, the process moves to the fixing operation of step S34. When the designation is YES (manually) at step S28, as described by using FIGS. 8A and 8B, the text registering person designates a location to be caused to be updatable (step S32). Next, the process moves to the fixing operation of step S34.

When the process moves to step S34, and the text registering person executes the fixing operation (step S34), the content managing server 22 registers the text (step S36). That is, data (file) of the registered text is read from the PC 28 to the content managing server 22, and also, is transferred from the content managing server 22 to the database server 24, and is stored in the content database 80 of the database server 24.

Based on the information inputted by the text registering person as described above, data of the text managing table 82, data of the text attribute managing table 84, and data of the updatable location managing table 86 are generated by the text managing table data generating device 42, the text attribute managing table data generating device 44, and the updatable location managing table data generating device 48 respectively, and are added as a record to the corresponding tables of the database server 24.

Next, in FIG. 2, the content processed by the processing device relating to the browsing and the updating by the portable phone 14 for the text will be described.

In FIG. 2, the portable phone 14 denotes a portable phone used by a text browsing person which tries to browse or update the registered text managed by the in-company network 10 from outside, and the like, and when browsing or updating the registered text, the text browsing person connects the portable phone 14 to the communicating network 12, and accesses the content managing server 22 of the in-company network 10 through the communicating network 12. Next, the text browsing person executes a series of works for browsing or updating the registered text.

On the other hand, the content managing server 22 is provided with an information inputting outputting device 50, a browsed text obtaining device 52, a text updating device 54, and a format converting device 56 as relating to the browsing and the changing by the portable phone 14 for the registered text.

The information inputting outputting device 50 provides the portable phone 14 accessing to the content managing server 22 with the guidance screen for guiding the browsing and the changing for the registered text, and obtains information, which is inputted by the text browsing person at the portable phone 14 to the guidance screen, as information necessary for browsing or changing the registered text. Meanwhile, the information inputting outputting device 50 first prompts a user accessing to the content managing server 22 to input the password, and the like, and also, executes the user authentication whether or not the user owns the access right. Only the user which is authenticated to own the access right can browse and update the registered text.

While the detailed process content regarding the browsed text obtaining device 52 and the text updating device 54 will be described later, the browsed text obtaining device 52 is a device which obtains the registered text, which is designated by the text browsing person to be browsed, from the database server 24 based on information which is inputted by the portable phone 14 and is obtained by the information inputting outputting device 50, and the text updating device 54 is a device which updates (changes) the location designated by the text browsing person for the registered text which is being currently browsed based on information which is inputted by the portable phone 14 and is obtained by the information inputting outputting device 50.

When causing the portable phone 14 (a display of the portable phone 14) to display the registered text which is obtained by the browsed text obtaining device 52 and is to be browsed, or the text updated by the text updating device 54, or the like, the format converting device 56 executes a process for converting such texts generated in an arbitrary format (file format) to a format which can be browsed by the portable phone 14, e.g. a html file or an image file (JPEG, GIF, and the like). By transmitting this converted file to the portable phone 14 through the information inputting outputting device 50, the text in an arbitrary format can be browsed by the portable phone 14.

Figure 10:
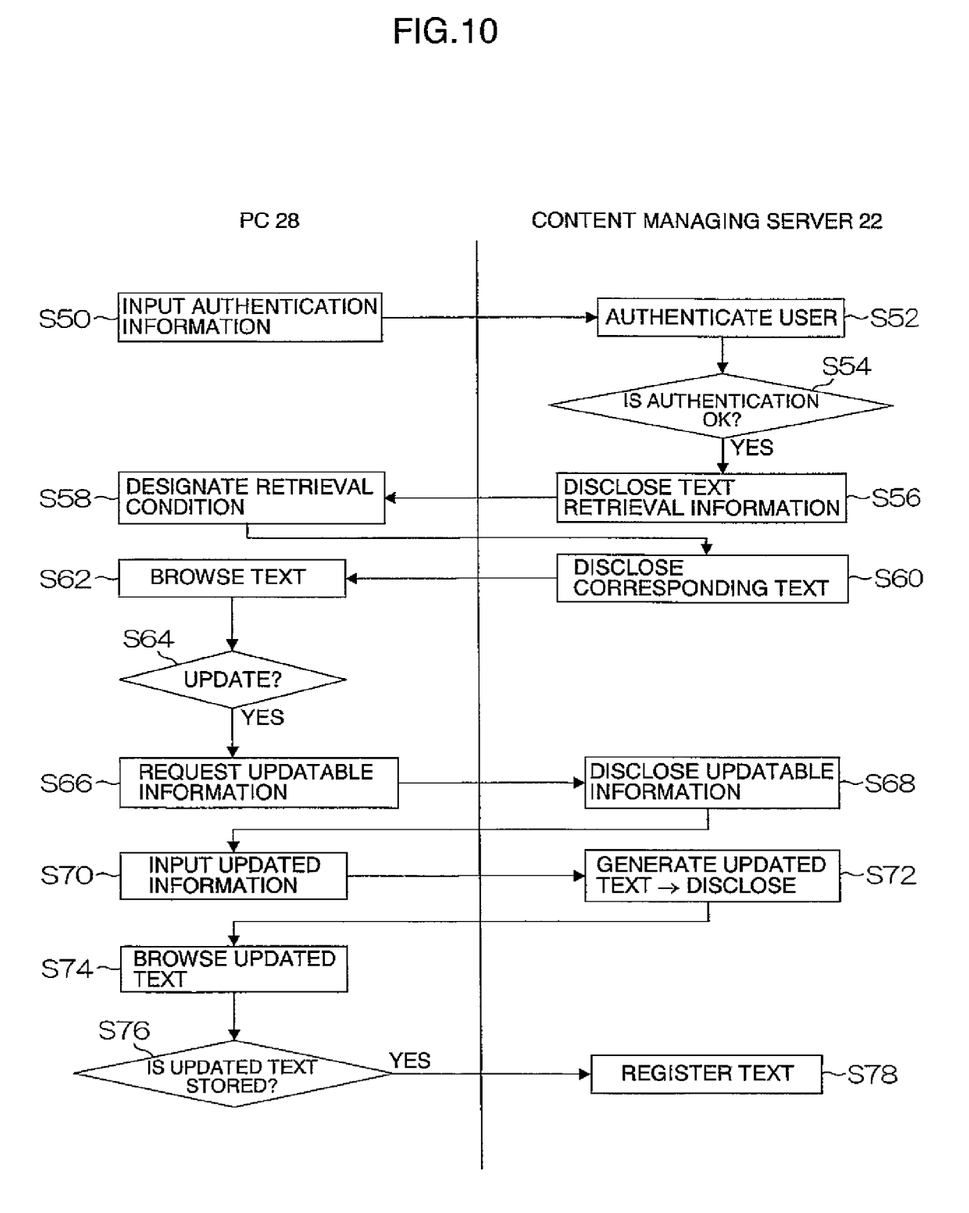
FIG. 10 is a sequence diagram illustrating a process in a time sequence when the text is browsed or changed in the portable phone and the content managing server.

FIG. 10 is a sequence diagram illustrating in a time sequence the process when the text is browsed and updated in the portable phone 14 operated by the text browsing person and the content managing server 22 managed by the server manager.

First, the text browsing person accesses the content managing server 22 with the portable phone 14. Thereby, the user authentication screen transmitted by the information inputting outputting device 50 of the content managing server 22 is displayed on the portable phone 14. The text browsing person inputs the authentication information such as the previously-registered password to indicate that the text browsing person owns the access right on the user authentication screen (step S50).

On the other hand, the content managing server 22 checks the authentication information obtained by the information inputting outputting device 40, and the generating person managing table of FIG. 4 stored in the database server 24, and executes the user authentication whether or not the accessing text browsing person owns the formal access right (step S52). The content managing server 22 determines whether or not the user authentication has been appropriately executed (step S54), and when the determination is NO, the user is restricted to access, and when the determination is YES, the user is allowed to access.

Figure 11A:
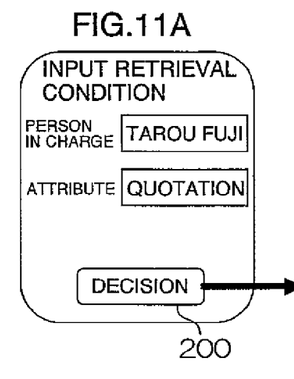
FIGS. 11A to 11G are diagrams exemplifying a screen displayed in the portable phone when the text is browsed or changed.

Next, when executing the user authentication, the content managing server 22 discloses text retrieval information to the portable phone 14 with the information inputting outputting device 50 (step S56), and for example, causes the portable phone 14 to display a screen for inputting a retrieval condition as illustrated in FIG. 11A.

Figure 11B:
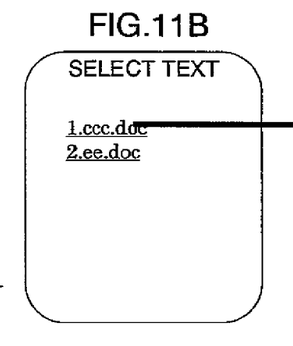

The text browsing person inputs the retrieval condition on the input screen displayed on the portable phone 14 (step S58). In FIG. 11A, the text browsing person inputs [person in charge] (a name of the text registering person) and [attribute]. Next, the text browsing person pushes a decision button 200 (selects and executes). Thereby, the retrieval condition is obtained by the information inputting outputting device 50 of the content managing server 22, and is transferred from the content managing server 22 to the database server 24. The database server 24 retrieves the registered text satisfying the retrieval condition in the registered texts stored in the content database 80, and obtains a file name of the registered text. In this case, the database server 24 retrieves by referring to data of the text managing table 82 and the text attribute managing table 84. Next, the database server 24 transfers a result of the retrieving to the content managing server 22, and a screen illustrated in FIG. 11B is transmitted to the portable phone 14 by the information inputting outputting device 50. Thereby, the file name of the registered text satisfying the retrieval condition is displayed on the portable phone 14 as illustrated in FIG. 11B, and when a plurality of the registered texts satisfy the retrieval condition, a plurality of the file names are list-displayed.

Next, when the text browsing person selects the file name of the registered text to be browsed from the file names of the result of the retrieving, the browsed text obtaining device 52 of the content managing server 22 obtains a file of the registered text corresponding to the file name from the content database 80 of the database server 24.

Thereby, when the registered text designated by the text browsing person is obtained by the browsed text obtaining device 52, the registered text is converted by the format converting device 56 to a format (file format) which can be browsed by the portable phone 14. For example, the registered text is converted to an html file or an image file (JPGE, GIF, and the like). Next, the converted file is transmitted as a text to be browsed from the information inputting outputting device 50 to the portable phone 14 (step S60). Thereby, the registered text which is designated to be browsed is displayed as a browsable text on the portable phone 14 as illustrated in FIG. 11C (step S62).

Figure 11C:
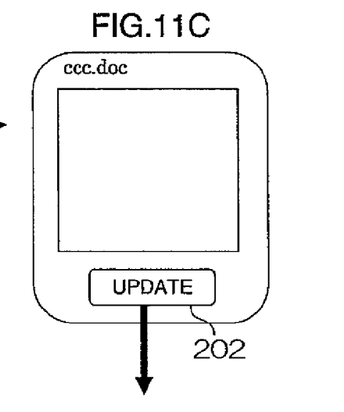

Next, the text browsing person selects on the screen of FIG. 11C whether or not to update the registered text which is being browsed (step S64). When updating, the text browsing person pushes an updating button 202 displayed under the screen. Thereby, a signal requesting information on an updatable location and words is transmitted from the portable phone 14 to the content managing server 22 (step S66).

The text updating device 54 of the content managing server 22 obtains the record regarding the registered text which is currently being browsed from the updatable location managing table 86 which is stored in the database server 24, and is illustrated in FIG. 7. Next, the text updating device 54 refers to the record, and transmits a screen as illustrated in FIG. 11D, which list-displays words (existing information of the updatable location managing table 86) of the locations which are registered as an updatable location, to the portable phone 14 through the information inputting outputting device 50.

The text updating device 54 generates a text obtained by changing a color of the words of the updatable locations to a color (e.g. red) which is different from a color of other words for the original registered text (original text), and after the format converting device 56 converts the text to a format which can be browsed by the portable phone 14, the information inputting outputting device 50 transmits the text to the portable phone 14. Thereby, the text in which the changeable locations are indicated is displayed in the upper part of the screen as illustrated in FIG. 11D (step S68).

Figure 11D:
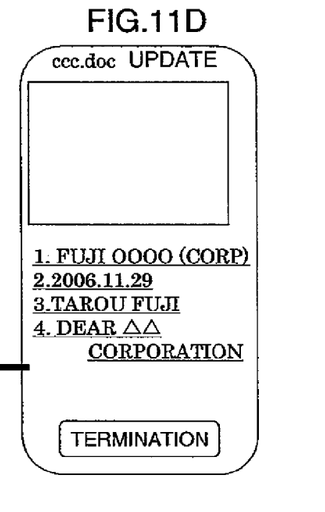
Figure 11E:
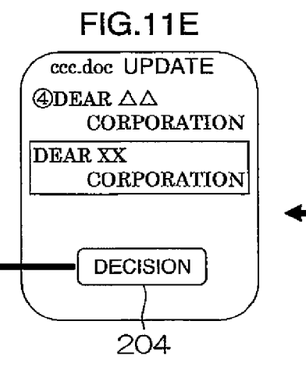

When the text browsing person selects the words to be updated in FIG. 11D, the screen as illustrated in FIG. 11E is displayed. The text browsing person inputs the updated words for the selected words in the screen, and when pushing a decision button 204, the location to be updated and the updated words of the location are transferred as update information from the portable phone 14 to the content managing server 22 (step S70).

Figure 11F:
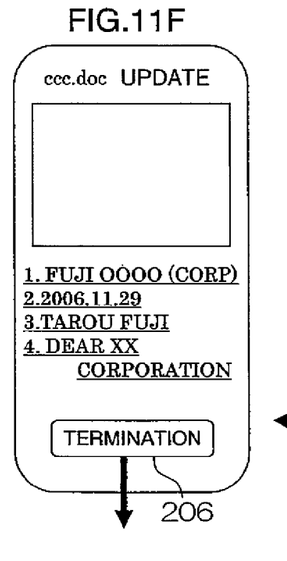

The text updating device 54 of the content managing server 22 obtains the update information transmitted from the portable phone 14 through the information inputting outputting device 50. The text updating device 54 changes the words of the location which is designated to be updated for the original text to the updated words, and generates the updated text whose format is the same as that of the original text. The updated text is converted by the format converting device 56 to a format which can be browsed by the portable phone 14, and a screen whose configuration is the same as that of FIG. 11D is transmitted to the portable phone 14 through the information inputting outputting device 50 (step S72). Thereby, on the portable phone 14, as illustrated in FIG. 11F, while the words selected by the text browsing person are being updated to the updated words, the updated text is displayed in the upper part of the screen, and the words of the updatable location are displayed in the down part of the screen. Meanwhile, when the words of another updatable location are updated, or when the words of the once-updated location are further updated, the text browsing person executes the same operation as that of the screen of FIG. 11E on the screen of FIG. 11F.

Figure 11G:
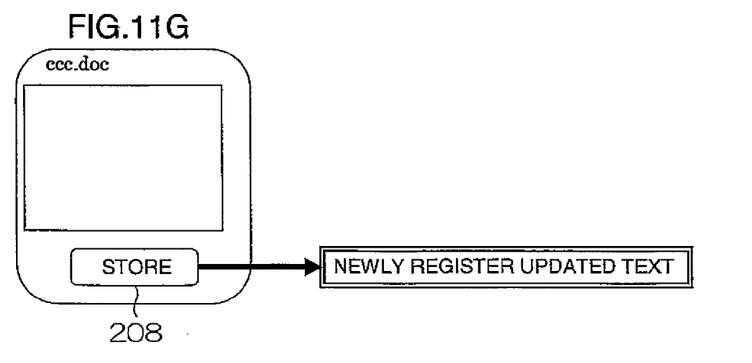

When the updating is completed, the text browsing person pushes a termination button 206 displayed under the screen of FIG. 11F. Thereby, a browsing screen as illustrated in FIG. 11G of the updated text, which is obtained by expanding the updated text, is displayed (step S74). Next, the text browsing person determines whether or not to store the updated text (step S76). When storing the updated text, the text browsing person pushes a storing button 208 displayed under the screen of FIG. 11G. Thereby, a signal for instructing the storing for the updated text is transferred from the portable phone 14 to the content managing server 22, and the updated text, which is generated by the text updating device 54 and whose format is the same as that of the original text, is registered as being related to the original text in the content database 80 of the database server 24 (step S78). Meanwhile, the updated text may be stored in a format which is different from that of the original text.

Figure 12:
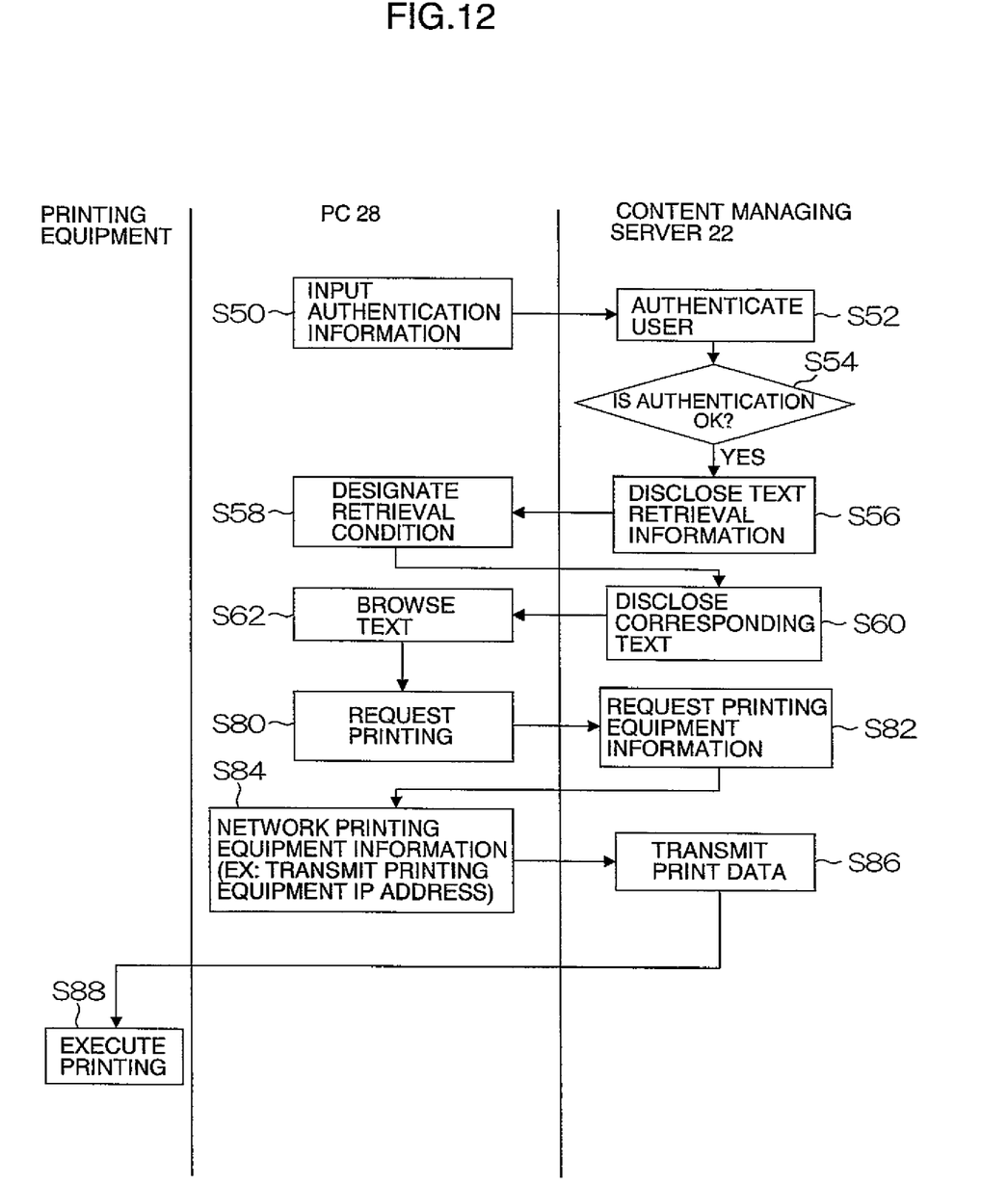
FIG. 12 is a sequence diagram illustrating processes in a time sequence in the portable phone, the content managing server, and a printing equipment when the text is printed.

Next, the processing when the registered text browsed by the portable phone 14, or the like is printed by a desired printer (printing equipment) as described above will be described. FIG. 12 is a sequence diagram illustrating in a time sequence the process when the text is printed in the portable phone 14 operated by the text browsing person (a print executing person), the content managing server 22 managed by the server manager, and the printing equipment which prints the browsed text. In FIG. 12, the processes from step S50 to step S62 are executed as illustrated in FIG. 10, and the registered text which the print executing person needs to print is displayed on the portable phone 14 according to the process which is the same as that of the case when the registered text is browsed. Meanwhile, when the registered text is updated as illustrated in FIG. 10, the processes after step S80 of FIG. 12 can be executed for the registered text, and when the registered text is temporarily registered as illustrated in FIG. 10, the processes after step S80 of FIG. 12 can be also executed while the updated text is being browsed again as the registered text.

When the print executing person continuously instructs the printing with the predetermined operation, a printing request signal is transmitted from the portable phone 14 to the content managing server 22 (step S80). When receiving the printing request signal, the content managing server 22 transmits a screen for requesting that information (information for specifying a destination to which data is transmitted) on the printing equipment used for the printing is inputted to the portable phone 14 (step S82). The print executing person inputs the information requested in the screen displayed on the portable phone 14, and transmits the information to the content managing server 22 (step S84). For example, under such a condition that a usable equipment can be connected to the communicating network 12, the print executing person transmits the IP address of the used printing equipment.

The content managing server 22 transmits data for printing the registered text displayed by the portable phone 14 at step S62 to the printing equipment designated by the print executing person based on the information obtained from the portable phone 14 (step S86). Thereby, the registered text is printed by the printing equipment.

As described above, in the above embodiment, while contents, and the like managed by the content managing server 22 are stored in the database server 24 other than the content managing server 22, the data stored in the database server 24 may be stored in the content managing server 22 in the above embodiment.

What is claimed is:
1. A content managing system causing each content managed by a server connected to a communicating network to be able to be updated by a portable terminal which can be connected to the communicating network, comprising:
 a content updatable location registering device which previously registers a location which can be updated by the portable terminal for each of the contents in the server;

a content selecting device which selects the desired content of each of the contents with the portable terminal;

an updated location selecting device which selects the location to be updated with the portable terminal from the locations registered as the updatable location by the content updatable location registering device for the content selected by the content selecting device;

an updated data inputting device which inputs the updated data of the location selected by the updated location selecting device with the portable terminal; and an updated content generating device which generates an updated content obtained by changing data of the location selected by the updated location selecting device to the updated data inputted by the updated data inputting device for the content selected by the content selecting device in the server.

2. The content managing system according to claim 1, wherein, when registering each of the contents as a content managed by the server, the content updatable location registering device automatically sets a location to be updated.

3. The content managing system according to claim 1, wherein, when registering each of the contents as a content managed by the server, the content updatable location registering device comprises, an updatable location designating device which designates a location to be updated from a user, and registers the location designated by the updatable location designating device as the location to be updated.

4. The content managing system according to claim 1, further comprising:

a format converting device which converts the content selected by the content selecting device or the content generated by the updated content generating device to a format which can be browsed by the portable terminal, and transmits the converted content from the server to the portable terminal.

5. The content managing system according to claim 1, further comprising:

an updated content registering device which registers the updated content generated by the updated content generating device as a new content managed by the server.

6. The content managing system according to claim 1, further comprising:

a printing device which causes a printing equipment to print the content selected by the content selecting device, or the content generated by the updated content generating device, the printing equipment being a printing equipment connectable to the communicating network, and being designated by the portable terminal.

7. The content managing system according to claim 1, wherein the content is a text.

8. The content managing system according to claim 1, wherein the portable terminal is a portable phone.

* * * * *